US009326122B2

(12) United States Patent
Xiong et al.

(10) Patent No.: US 9,326,122 B2
(45) Date of Patent: Apr. 26, 2016

(54) USER EQUIPMENT AND METHOD FOR PACKET BASED DEVICE-TO-DEVICE (D2D) DISCOVERY IN AN LTE NETWORK

(71) Applicant: Intel IP Corporation, Santa Clara, CA (US)

(72) Inventors: Gang Xiong, Beaverton, OR (US); Huaning Niu, Milpitas, CA (US); Debdeep Chatterjee, Santa Clara, CA (US); Alexey Khoryaev, Dzerzhinsk (RU); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/280,799

(22) Filed: May 19, 2014

(65) Prior Publication Data

US 2015/0045016 A1 Feb. 12, 2015

Related U.S. Application Data

(60) Provisional application No. 61/863,902, filed on Aug. 8, 2013, provisional application No. 61/909,938, filed on Nov. 27, 2013.

(51) Int. Cl.
*H04W 48/12* (2009.01)
*H04W 72/02* (2009.01)
(Continued)

(52) U.S. Cl.
CPC .............. *H04W 8/005* (2013.01); *H04W 4/005* (2013.01); *H04W 4/008* (2013.01); *H04W 48/12* (2013.01); *H04W 72/02* (2013.01); *H04W 72/08* (2013.01); *H04W 76/023* (2013.01); *H04W 4/023* (2013.01)

(58) Field of Classification Search
CPC ....... B61D 19/02; B61D 23/02; H04W 48/12; H04W 4/008; H04W 72/02; H04W 76/023; H04W 8/005

USPC ....................................................... 455/426.1
See application file for complete search history.

(56) References Cited

U.S. PATENT DOCUMENTS

2006/0293061 A1* 12/2006 Kobayashi et al. ........... 455/455
2007/0019578 A1* 1/2007 Meiri ............................ 370/311
(Continued)

FOREIGN PATENT DOCUMENTS

EP 2509345 A1 10/2012
KR 1020120039605 A 4/2012
(Continued)

OTHER PUBLICATIONS

"Evolved Universal Terrestrial Radio Access (E-UTRA) and Evolved Universal Terrestrial Radio Access Network (E-UTRAN)", 3GPP TS 36.300 v11.6.0 Technical Specification Group Radio Access Network. Release 11, (Jun. 2013), 209 pgs.

(Continued)

*Primary Examiner* — Kashif Siddiqui
*Assistant Examiner* — Ather Mohiuddin
(74) *Attorney, Agent, or Firm* — Schwegman Lundberg & Woessner, P.A.

(57) ABSTRACT

Embodiments of a User Equipment (UE) and methods for packet based device-to-device (D2D) discovery in an LTE network are generally described herein. In some embodiments, UE may be enabled for proximity services and may be configured to receive signaling from an enhanced node B (eNB) indicating resources allocated for D2D discovery. The UE may configure a discovery packet in accordance with a predetermined configuration to have at least a discovery payload and a cyclic-redundancy check (CRC). The discovery payload may include discovery-related content. The UE may be configured to transmit the discovery packet on at least some of the indicated resources for receipt by a receiving UE. In some embodiments, a demodulation reference signal (DMRS) may be selected to indicate a payload size and/or MCS of the discovery packet's payload.

23 Claims, 3 Drawing Sheets

(51) Int. Cl.
*H04W 8/00* (2009.01)
*H04W 72/08* (2009.01)
*H04W 4/00* (2009.01)
*H04W 76/02* (2009.01)
*H04W 4/02* (2009.01)

(56) References Cited

U.S. PATENT DOCUMENTS

| | | | |
|---|---|---|---|
| 2007/0165593 A1 | 7/2007 | Hundal et al. | |
| 2008/0063106 A1 | 3/2008 | Hahm et al. | |
| 2008/0119130 A1 | 5/2008 | Sinha | |
| 2008/0267162 A1 | 10/2008 | Benveniste | |
| 2009/0122736 A1 | 5/2009 | Damnjanovic et al. | |
| 2009/0327395 A1* | 12/2009 | Park et al. | 709/202 |
| 2011/0080873 A1* | 4/2011 | Zhang et al. | 370/328 |
| 2011/0199905 A1 | 8/2011 | Pinheiro et al. | |
| 2011/0274040 A1 | 11/2011 | Pani et al. | |
| 2012/0039321 A1 | 2/2012 | Ghosh et al. | |
| 2012/0064902 A1 | 3/2012 | Kronander et al. | |
| 2012/0087247 A1 | 4/2012 | Min et al. | |
| 2012/0163311 A1 | 6/2012 | Park | |
| 2012/0207073 A1* | 8/2012 | Kim et al. | 370/311 |
| 2012/0249372 A1* | 10/2012 | Jovicic et al. | 342/451 |
| 2012/0275365 A1 | 11/2012 | Anderson et al. | |
| 2012/0275366 A1 | 11/2012 | Anderson et al. | |
| 2013/0044623 A1 | 2/2013 | Speight et al. | |
| 2013/0080597 A1 | 3/2013 | Liao | |
| 2013/0194941 A1 | 8/2013 | Lu et al. | |
| 2013/0195026 A1 | 8/2013 | Johnsson et al. | |
| 2013/0230035 A1* | 9/2013 | Grandhi et al. | 370/338 |
| 2013/0294399 A1 | 11/2013 | Lee | |
| 2013/0322276 A1* | 12/2013 | Pelletier et al. | 370/252 |
| 2014/0003262 A1* | 1/2014 | He et al. | 370/252 |
| 2014/0003348 A1 | 1/2014 | Velev et al. | |
| 2014/0010179 A1 | 1/2014 | Lee | |
| 2014/0335867 A1 | 11/2014 | Hsu et al. | |
| 2014/0370904 A1* | 12/2014 | Smith et al. | 455/450 |
| 2015/0009883 A1 | 1/2015 | Bai et al. | |
| 2015/0016312 A1 | 1/2015 | Li et al. | |
| 2015/0043403 A1 | 2/2015 | Martinez Tarradell et al. | |
| 2015/0043445 A1 | 2/2015 | Xiong et al. | |
| 2015/0043448 A1 | 2/2015 | Chatterjee et al. | |
| 2015/0043449 A1 | 2/2015 | Bangolae et al. | |
| 2015/0146585 A1 | 5/2015 | Rashid et al. | |
| 2015/0146645 A1 | 5/2015 | Sergeyev et al. | |
| 2015/0195831 A1 | 7/2015 | Du et al. | |
| 2015/0257094 A1 | 9/2015 | Wei et al. | |

FOREIGN PATENT DOCUMENTS

| | | |
|---|---|---|
| KR | 1020120137496 A | 12/2012 |
| KR | 1020130035964 A | 4/2013 |
| TW | 201521505 A | 6/2015 |
| WO | WO-2011099821 A2 | 8/2011 |
| WO | WO-2011112051 A2 | 9/2011 |
| WO | WO-2011119680 A2 | 9/2011 |
| WO | WO-2012136311 A1 | 10/2012 |
| WO | WO-2012177002 A2 | 12/2012 |
| WO | WO-2013012759 A1 | 1/2013 |
| WO | WO-2013025057 A2 | 2/2013 |
| WO | WO-2013048193 A1 | 4/2013 |
| WO | WO-2015021267 A1 | 2/2015 |
| WO | WO-2015021276 A1 | 2/2015 |
| WO | WO-2015021284 A1 | 2/2015 |
| WO | WO-2015021315 A1 | 2/2015 |
| WO | WO-2015021317 A1 | 2/2015 |
| WO | WO-2015080796 A1 | 6/2015 |

OTHER PUBLICATIONS

"Evolved Universal Terrestrial Radio Access (E-UTRA); Physical Channels and Modulation", 3GPP TS 36.211 v11.0.0 Technical Specification Group Radio Access Network, Release 11, (Sep. 2012), 106 pgs.
"Evolved Universal Terrestrial Radio Access (E-UTRA); Physical layer procedures", 3GPP TS 36.213 v11.0.0 Technical Specification Group Radio Access Network, Release 11, (Sep. 2012), 143 pgs.
"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
"Evolved Universal Terrestrial Radio Access (E-UTRA); User Equipment (UE) radio access capabilities", 3GPP TS 36.306 v11.3.0 Technical Specification Group Radio Access Network, Release 11, (Mar. 2013), 27 pgs.
"Evolved Universal Terrestrial Radio Access (E-UTRS) User Equipment (UE) procedures in idle mode", 3GPP TS 36.304 v11.4.0 Technical Specification Group Radio Access Network, Release 11, (Jun. 2013), 34 pgs.
"Evolved Universal Terrestrial Radio Access (E_UTRA); Multiplexing and channel coding", 3GPP TS 36.212 v11.0.0, Technical Specification Group Radio Access Network, Release 11, (Sep. 2012), 79 pgs.
"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.
"Machine-Type and other Mobil Data Applications Communications Enhancements", 3GPP TSG SA WG2 Meeting #92, TD S2-123002; 3GPP TR 23.887 v0.1.0, Release 12, (May 2012), 16 pgs.
"Machine-Type and other Mobile Data Applications Communications Enhancemetns", 3GPP TR 23.887 v1.1.0 Technical Specification Group Services and System Aspects (Release 12), (Sep. 2013), 153 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"Study on LTE Device to Device Proximity Services", 3GPP TSG Ran Meeting#58, RP-122009, Qualcomm Incorporated, [Online]. Retrieved from the Internet: <URL: http://www.3gpp.org/ftp/tsg_ran/TSG_RAN/TSGR_58/Docs/RP-122009.zip>, (2012), 6 pgs.
"Study on provision of low-Cost MTC UEs based on LTE", 3GPP TR 36.888 v2.1.1 Technical Specification Group Radio Access Network, Release 12, (Jun. 2013), 55 pgs.
Andreev, S., et al., "Efficient small data access for machine-type communications in LTE", 2013 IEEE International Conference on Communications (ICC), (2013), 3569-3574.
"U.S. Appl. No. 14/300,937, Non Final Office Action mailed Sep. 25, 2015", 12 pgs.
"U.S. Appl. No. 14/318,008, Non Final Office Action mailed Oct. 8, 2015", 16 pgs.
"U.S. Appl. No. 14/318,085, Non Final Office Action mailed Oct. 8, 2015", 14 pgs.
"Discussion of D2D discovery methods", R1-132068, 3GPP TSG RAN WG1 Meeting #73, (May 2013), 1-5.
"Discussion on design options for D2D discovery", R1-131924, 3GPP TSG RAN WG1 Meeting #73, (May 2013), 1-6.
"International Application Serial No. PCT/US2014/050128, International Search Report mailed Nov. 13, 2014", 8 pgs.
"International Application Serial No. PCT/US2014/050128, Invitation to Correct Defects mailed Aug. 14, 2014", 4 pgs.
"International Application Serial No. PCT/US2014/050128, Written Opinion mailed Nov. 13, 2014", 7 pgs.
"International Application Serial No. PCT/US2014/050147, International Search Report mailed Nov. 13, 2014", 3 pgs.
"International Application Serial No. PCT/US2014/050147, Written Opinion mailed Nov. 13, 2014", 6 pgs.

(56) References Cited

OTHER PUBLICATIONS

"International Application Serial No. PCT/US2014/050159, International Search Report mailed Nov. 18, 2014", 3 pgs.
"International Application Serial No. PCT/US2014/050159, Written Opinion mailed Nov. 18, 2014", 7 pgs.
"International Application Serial No. PCT/US2014/050207, International Search Report mailed Nov. 19, 2014", 3 pgs.
"International Application Serial No. PCT/US2014/050207, Written Opinion mailed Nov. 19, 2014", 6 pgs.
"International Application Serial No. PCT/US2014/050209, International Search Report mailed Nov. 27, 2014", 3 pgs.
"International Application Serial No. PCT/US2014/050209, Written Opinion mailed Nov. 27, 2014", 8 pgs.
"International Application Serial No. PCT/US2014/057619, International Search Report mailed Dec. 26, 2014", 3 pgs.
"International Application Serial No. PCT/US2014/057619, Written Opinion mailed Dec. 26, 2014", 6 pgs.
"ProSe direct communication (D2D)", R1-132174, 3GPP TSG-RAN WG1 Meeting #73, Renesas Mobile Europe Ltd, (May 2013), 1-4.
"Taiwanese Application Serial No. 103125302, Office Action mailed Sep. 23, 2015", W/ English Translation, 7 pgs.
"Techniques for D2D Discovery", R1-132503, 3GPP TSG RAN WG1 Meeting #73, (May 2013), 1-7.
Alcatel-Lucent, et al., "PRACH coverage extension for MTC devices", R1-130939, 3GPP TSG-RAN WG1 Meeting #72bis, Chicago, USA, [Online]. Retrieved from the Internet: <URL: http://www.3gpp.org/ftp/tsg_ran/wgl_r11/TSGRL_72b/Docs/>, (Apr. 15-19, 2013), 3 pgs.
Ericsson, et al., "D2D for LTE Proximity Services: Overview", 3GPP TSG-RAN WG1 #73, R1-132028, (May 2013), 6 pgs.

\* cited by examiner

USER EQUIPMENT AND METHOD FOR PACKET BASED DEVICE-TO-DEVICE (D2D) DISCOVERY IN AN LTE NETWORK

PRIORITY CLAIMS

This application claims the benefit of priority under 35 USC 119(e) to U.S. Provisional Patent Application Ser. No. 61/863,902, filed Aug. 8, 2013, and to U.S. Provisional Patent Application Ser. No. 61/909,938, filed Nov. 27, 2013, both of which are incorporated herein by reference in their entireties.

TECHNICAL FIELD

Embodiments pertain to wireless communications. Some embodiments relate to cellular networks such as 3GPP LTE (Long Term Evolution) networks. Some embodiments relate to direct device-to-device (D2D) communication. Some embodiments relate to D2D discovery in LTE networks. Some embodiments relate to user equipment (UE) enabled for proximity services (ProSe enabled UEs).

BACKGROUND

Support for direct D2D communication as an integrated part of a wireless communication network is currently being considered for the further evolution of LTE networks. With direct D2D communication, user equipment (UE) may communicate directly with each other without involvement of a base station or an enhanced node B (eNB). One issue with D2D communication is device discovery to enable D2D communications. Device discovery involves discovering one or more other discoverable UEs within communication range for D2D communication. Device discovery also involves being discovered by one or more other discovering UEs within communication range for D2D communications. There are many unresolved issues with respect to device discovery for D2D communication including the signaling used for device discovery and the discovery information conveyed during device discovery.

Thus there are general needs for UEs and methods for improved device discovery for D2D communication in LTE networks. There are also general needs for UEs and methods for signaling and conveying discovery information for D2D discovery.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
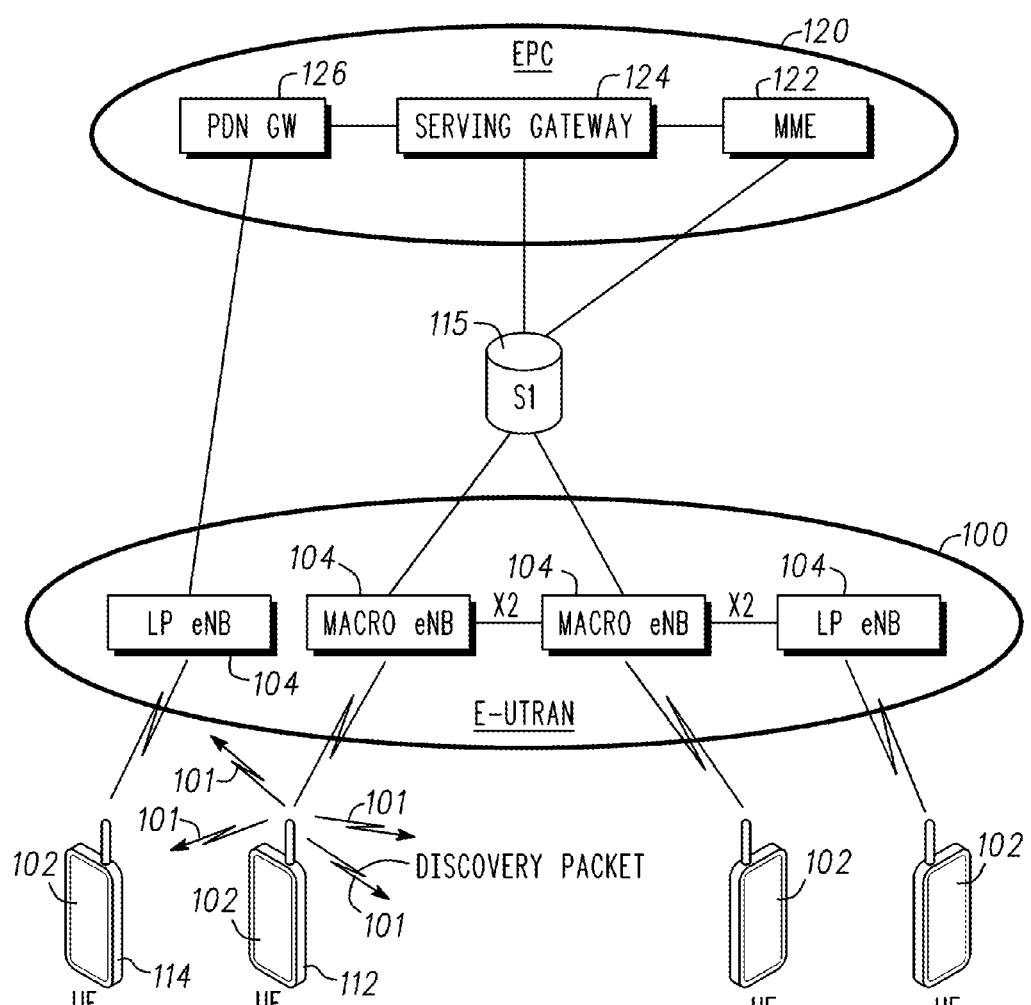
FIG. 1 shows a portion of an end-to-end network architecture of an LTE network in accordance with some embodiments.

FIG. 1 shows a portion of an end-to-end network architecture of an LTE network with various network components in accordance with some embodiments. The network architecture comprises a radio access network (RAN) (e.g., as depicted, the E-UTRAN or evolved universal terrestrial radio access network) 100 and a core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124 and packet data network gateway (PDN GW) 126. The RAN also includes enhanced node Bs (eNBs) 104 (which may operate as base stations) for communicating with user equipment (UE) 102. The eNBs 104 may include macro eNBs and low power (LP) eNBs.

In accordance with some embodiments, the UEs 102 may be arranged for device-to-device (D2D) communications including D2D discovery of other UEs for direct D2D communication. Some embodiments provide a physical layer design for packet-based D2D discovery. In some embodiments, a UE, such as UE 112, may configure and transmit a discovery packet 101 (e.g., rather than a discovery sequence) to realize D2D discovery. This allows additional discovery-related content to be shared directly between the UEs. In these embodiments, the UE 112 that transmits the discovery packet 101 may be referred to as a discovering device since it is discovering another UE (e.g., UE 114). These embodiments are discussed in more detail below.

The MME is similar in function to the control plane of legacy Serving GPRS Support Nodes (SGSN). The MME manages mobility aspects in access such as gateway selection and tracking area list management. The serving GW 124 terminates the interface toward the RAN 100 and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN and may be a key node for policy enforcement and charging data collection. It may also provide an anchor point for mobility with non-LTE accesses. The external PDN may be any kind of IP network as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well or to add network capacity in areas with very dense phone usage, such as train stations. As used herein, the term LP eNB refers to any suitable relatively lower power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically thirty to fifty meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.) or more recently in-aircraft. A picocell eNB can generally connect through the X2 link to another eNB such as a macro eNB through its base station controller (BSC) functionality. A LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point, base station or enterprise femtocell.

In some LTE embodiments, a physical downlink shared channel (PDSCH) carries user data and higher-layer signaling to a UE 102. The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs within a cell) is performed at the eNB 104 based on channel quality information fed back from the UEs 102 to the eNB 104, and then the downlink resource assignment information may be sent to a UE 102 on a physical downlink control channel (PDCCH) used for (and possibly assigned to) the UE 102.

The PDCCH uses CCEs (control channel elements) to convey the control information. Before being mapped to resource elements, the PDCCH complex-valued symbols may be first organized into quadruplets, which may be permuted using a sub-block inter-leaver for rate matching. Each PDCCH is transmitted using one or more of CCEs, where each CCE may correspond to nine sets of four physical resource elements known as resource element groups (REGs). Four QPSK symbols are mapped to each REG. The PDCCH may be transmitted using one or more CCEs, depending on the size of DCI and the channel condition. There may be four or more different PDCCH formats defined in LTE with different numbers of CCEs (e.g., aggregation level L=1, 2, 4, or 8).

Figure 2:
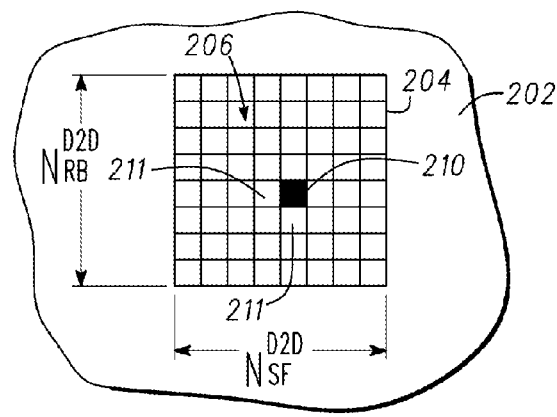
FIG. 2 shows a structure for a resource grid including a discovery zone for D2D communications in accordance with some embodiments.

FIG. 2 shows a structure for a resource grid including a discovery zone for D2D communications in accordance with some embodiments. The depicted grid is a time-frequency grid, called a resource grid, which is the physical resource in the downlink or uplink in each slot. The smallest time-frequency unit in a resource grid is denoted as a resource element (RE). The resource grid comprises a number of resource blocks (RBs) which describe the mapping of certain physical channels to resource elements. Each resource block comprises a collection of resource elements and in the frequency domain, represents the smallest quanta of resources that may be allocated, although the scope of the embodiments is not limited in this respect. There are several different physical channels that are conveyed using such resource blocks. The resource grid illustrated in FIG. 2 may comprise an LTE operation zone 202 which may comprise a plurality of physical RBs (PRBs) for use by the RAN 100.

In accordance with some embodiments, a UE 112 (FIG. 1) may receive signaling from an eNB 104 (FIG. 1) indicating a discovery zone 204 within the LTE operation zone 202. The discovery zone 204 may comprise a plurality of PRBs 206 of a discovery resource. The UE 112 may transmit a discovery packet 101 (FIG. 1) for receipt by one or more other UEs (e.g., UE 114 (FIG. 1)) for D2D discovery within some PRBs 206 of the discovery zone 204. In some embodiments, the resources allocated for D2D discovery may be resources of a physical-uplink shared channel (PUSCH), although the scope of the embodiments is not limited in this respect.

A PRB may be associated with a particular slot of a subframe in the time dimension and a particular group of frequency subcarriers in the frequency dimension. Each PRB, for example, may be identified by a RB index and a subframe index. In some embodiments, a discovery packet 101 may be transmitted within M subframes of N resources blocks where M and N are at least one and may be greater than one. These embodiments are described in more detail below.

In some embodiments, a PRB may comprise twelve subcarriers in the frequency domain by 0.5 ms (i.e., one slot) in the time domain. The PRBs may be allocated in pairs (in the time domain), although this is not a requirement. In some embodiments, a PRB may comprise a plurality of REs. A RE may comprise one sub-carrier by one symbol. When a normal CP is used, a RB contains seven symbols. When an extended CP is used, the RB contains six symbols. A delay spread that exceeds the normal CP length indicates the use of extended CP. Each subframe may be one millisecond (ms) and one frame may comprise ten such subframes.

There are two different approaches in D2D discovery: restricted/closed D2D discovery and open D2D discovery. Restricted/closed D2D discovery may apply to use cases wherein a discoverable device may be discovered only by a select set of ProSe enabled discovering devices. A further implication of closed device discovery is consideration of scenarios wherein a discovering device tries to discover particular ProSe enabled device(s) (one or many from a set of ProSe enabled devices). Thus, for this use case, a discovering device would be assumed to know the ProSe enabled device it wishes to discover in its proximity.

Contrary to closed D2D discovery, open device discovery considers use cases wherein a discoverable device may want itself to be discovered by all ProSe enabled devices in its proximity. From the perspective of the discovering device, open device discovery implies that a discovering device may not be assumed to be aware of the identity of other ProSe enabled devices prior to discovery. Consequently, the device discovery mechanism for open discovery should aim towards discovering as many ProSe enabled devices in its proximity as possible.

For open D2D discovery, an eNB 104 may have a limited control on the discovery process among the UEs 102. In particular, an eNB 104 may periodically allocate certain discovery resources in the form of D2D discovery zones 204 for a UE 102 to transmit discovery information. As mentioned above, the discovery information may be in the form of a discovery packet with payload information. The examples described below are described with respect to a discovery packet with payload information. The discovery related information that UEs 102 may intend to share with each other may include a unique ID for device identification, a service identity, etc. (e.g., 48 bits or more) as the data payload, which may be protected by a cyclic-redundancy check (CRC). The number of resource blocks for discovery packet transmission in open D2D discovery design, which is denoted as $L_{RB}^{D2D}$, may be one or more, depending on the payload size and the overall discovery performance requirements.

In the examples illustrated below, the discovery zones may be periodic with each discovery zone comprising some RBs in the frequency domain and several subframes in time domain. In FIG. 2 $N_{RB}^{D2D}$, $n_{RB}^{start}$, $N_{SF}^{D2D}$ and $n_{SF}^{start}$ are denoted as the number of allocated RBs, the starting RB index and the number of subframes, the starting subframe index of each discovery zone, respectively. The information regarding the partitioning of the D2D discovery zones (such as discovery zone 204) may be semi-statically signaled by the eNB 104 using radio-resource control (RRC) signaling or by system information blocks (SIBs) for within network coverage scenarios. For a partial network coverage scenario, such information may be forwarded by an in-network coordinator UE to a UE that may be outside network coverage.

In some embodiments, for open D2D discovery, a UE 102 configured for D2D communication may randomly choose the subframe index and starting RB index within the discovery zone 204 to transmit a discovery packet 101. In some embodiments, the UE 102 may be configured for either open D2D discovery or closed D2D discovery. When configured for closed D2D discovery, an initial subframe within the discovery zone 204 may be assigned by the eNB 102 for transmission of the discovery packet 101. When configured for open D2D discovery, an initial subframe with the discovery zone 204 may be selected (e.g., randomly) by the UE 102 for transmission of the discovery packet 101. In some embodiments when configured for open D2D discovery the initial subframe with the discovery zone 204 may be randomly selected by the UE 102 for transmission of the discovery packet 101, although the scope of the embodiments is not limited in this respect.

For outside and partial network coverage scenarios, such information may be forwarded by the coordinator UE to the UEs that are outside network coverage. In these embodiments, for UEs that are outside the network coverage region, the configuration details for the D2D discovery zone may be either pre-configured or relayed by a UE within network coverage, or the configuration details may be configured by another UE outside network coverage. In some embodiments, a pool of resources constituting the discovery zone 204 may be associated with or configured by a synchronization source or any other coordinator UE. In these embodiments, a UE 102 may either be in a partial network coverage scenario if, for example, there is a presence of a network close by and it can communicate with and/or discover other UEs that are within network coverage, or fully outside network coverage.

For partial network coverage scenarios, discovery resources may be configured by an eNB 104 and may be relayed by another UE (e.g., a coordinator UE) that is within network coverage (and so, within operation zone of the network). For outside network coverage case, a specific spectrum may be allocated, although the scope of the embodiments is not limited in this respect. Once a UE determines that it is not under any network coverage or cannot detect synchronization signals that have originated from the network, the UE may search for synchronization signals on certain pre-configured spectrum band(s) for synchronization signals that may be transmitted by other UEs (i.e., not originating from an eNB 104), and for the latter case, the resources may be associated with the originating source of the synchronization signal or may be pre-configured.

As illustrated in FIG. 2, a discovery zone 204 may include one or more demodulation reference signal (DMRS) symbols 210. In some embodiments, resource elements 211 that are adjacent to DMRS symbols 210 may be used for D2D discovery. These embodiments are described in more detail below.

Figure 3A:
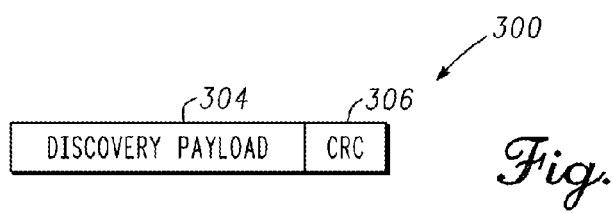
FIG. 3A illustrates a discovery packet in accordance with some embodiments.
Figure 3B:
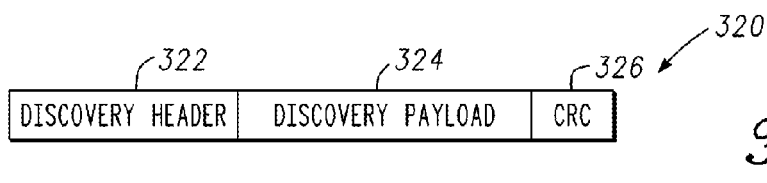
FIG. 3B illustrates a discovery packet in accordance with some alternate embodiments.

FIGS. 3A and 3B illustrate discovery packets in accordance with various embodiments. Discovery packet 300 (FIG. 3A) and discovery packet 320 (FIG. 3B) may be suitable for use as discovery packet 101 (FIG. 1). Discovery packet 300 includes a discovery payload 304 and a cyclic-redundancy check (CRC) 306. Discovery packet 320 includes a discovery header 322, a discovery payload 324 and a CRC 326. Discovery packet 300 does not include a header.

In accordance with embodiments, a UE, such as UE 112 (FIG. 1) enabled for proximity services (ProSe enabled) may be configured for packet-based D2D discovery operations in an LTE network, such as network 100 (FIG. 1). In these embodiments, the UE 112 may be configured to receive signaling from an eNB 104 (FIG. 1) indicating resources of a discovery zone 204 (FIG. 2) allocated for D2D discovery. A UE 112 may configure a discovery packet (i.e., discovery packet 300 (FIG. 3A) or discovery packet 320 (FIG. 3B)) in accordance with a predetermined configuration to have at least a discovery payload 304/324 and a CRC 306/326. The discovery payload 304/324 may include discovery-related content. The UE 112 may also be configured to transmit the discovery packet 101 on at least some of the indicated discovery resources (e.g., PRBs 206 of discovery zone 204) for receipt by a receiving UE 114. In these embodiments, a discovery packet, rather than a discovery sequence, is used to realize D2D discovery. This allows additional discovery-related content to be shared between UEs. In these embodiments, the UE 112 that transmits the discovery packet 101 may be referred to as a discovering device since it is discovering another UE (i.e., UE 114) and UE 114 may be referred to as a discoverable device.

In these embodiments, a discovery packet 300 may be configured without a header while in other embodiments, a discovery packet 320 may be configured with a header 322. In some embodiments, when the discovery packet 300 is configured without a header, a DMRS may be selected to indicate the payload size and/or the modulation and coding scheme (MCS) of the discovery payload 304. In some embodiments, when the discovery packet 320 is configured with a header 322, the discovery header 322 may indicate the payload size and/or MCS of the discovery payload 324. In some embodiments, when the discovery packet 300 is configured without a header, payload size and MCS of the discovery payload 304 may be predetermined. These embodiments, as well as other embodiments, are discussed in more detail below.

Referring to FIG. 3A, a UE 112 may configure and transmit the discovery packet 300 in accordance with the predetermined configuration (FIG. 3A) without a header. In some of these embodiments, the UE 112 may transmit an uplink DMRS. The DMRS may be selected to indicate the payload size and/or MCS of the discovery payload. In these embodiments, the payload size and MCS may be mapped to a particular DMRS. In these embodiments, the base sequence, the cyclic shift value and/or the orthogonal cover code of the DMRS may indicate one or more of the payload size and MCS of the discovery packet 300. In some of these embodiments, the base sequence, the cyclic shift value and/or the orthogonal cover code of the DMRS may indicate one or more payload size and MCS combinations.

In some embodiments, when the discovery packet 300 is configured and transmitted without a header, the discovery payload 304 may configurable to have one of a plurality of predetermined payload size and MCS combinations. Each of the predetermined payload size and MCS combinations may be mapped to one of a plurality of base sequences of the DMRS. The UE 112 may select a DMRS having one of the base sequences based on the payload size and MCS combination of the discovery packet 300. In some of these embodiments, the transmitting UE 112 may select a base sequence for the DMRS from a plurality of base sequences based on the payload size, the MCS or a combination of the payload size and the MCS of the discovery packet 300. The receiving UE 114 may perform a blind detection technique on the DMRS to search the plurality of base sequences to identify the particular base sequence to determined payload size and/or MCS of the discovery packet. In some of these embodiments, the MCS may be predetermined (i.e., fixed) and therefore only the payload size would be mapped to a particular one of the base sequences of the DMRS.

In some embodiments, when the discovery packet 300 is configured and transmitted without a header, the discovery payload 304 may be configurable to have one of a plurality of predetermined payload size and MCS combinations. Each of the predetermined payload size and MCS combinations may be mapped to one of a plurality of cyclic shifts (CS) values and/or an orthogonal cover codes (OCCs) of the DMRS. The UE 112 may select a DMRS (e.g., from a subset of DMRSs) to have a CS value and OCC based on the payload size and MCS combination of the discovery packet 300. In these embodiments, the receiving UE 114 may be able to determine the payload size and the MCS of the discovery packet 300 from the CS value and the OCC of the DMRS. In some of these embodiments, the base sequence of the DMRS would not provide any indication of the payload size and the MCS of the discovery packet, although the scope of the embodiments is not limited in this respect as the base sequence may also be used to indicate the payload size and/or the MCS. In these embodiments, the UE may select one DMRS from a subset of possible DMRSs for discovery packet transmission (e.g., with $n_{CS} \in (0,4,8)$ and $n_{OC} \in \{0,1\}$, where $n_{CS}$ is the cyclic shift index and $n_{OC}$ is the orthogonal cover code index). In these embodiments, for example, one subset of DMRS sequences with $n_{CS} \in \{0,4,8\}$ and $n_{OC} \in \{0\}$ may be used to indicate a discovery payload size of X bits while another subset of DMRS sequences with $n_{CS} \in \{0,4,8\}$ and $n_{OC} \in \{1\}$ may be used to indicate a discovery payload size of Y bits. Although these embodiments do not increase the number of blind detections for the case that the transmitting UE 112 randomly chooses a cyclic shift, these embodiments may effectively reduce the minimum distance between cyclic shifts if all transmitting UEs within radio range select the same payload size and MCS configuration.

In some embodiments, when the discovery packet 300 is configured and transmitted without a header, the discovery payload 304 may be configured to have a predetermined payload size, and to have a predetermined modulation and coding scheme (MCS). In some example embodiments, a predetermined payload size may be 192 bits, although the scope of the embodiments is not limited in this respect. In some example embodiments, a predetermined MCS the discovery payload 304 may be QPSK, although the scope of the embodiments is not limited in this respect. The use of a predetermined payload size and predetermined MCS allows the receiving UE 114 to receive and decode the discovery packet without additional processing (e.g., blind detection) to determine the payload size and MCS. In these embodiments, the receiving UE 114 may be configured to receive discovery packets 300 of a predetermined configuration within resources that are indicated for D2D discovery.

Referring to FIG. 3B, in some embodiments the UE 112 is arranged to configure and transmit the discovery packet 320 in accordance with the predetermined configuration (FIG. 3B) with a discovery header 322. In these embodiments, the discovery header 322 may be configured to indicate one of a plurality of predetermined payload size and MCS combinations of the discovery payload 324. In these embodiments that include a discovery header 322, the discovery packet 320 may be considered a discovery frame. In these embodiments, the discovery header 322 may be limited to a predetermined number of bits (e.g., two bits) to indicate one of several predetermined payload size and MCS combinations. In some of these embodiments, the MCS of the discovery payload 324 may be predetermined (i.e., fixed) in which the discovery header 322 may only indicate the payload size.

In some of these embodiments in which the UE 112 is arranged to configure and transmit the discovery packet 320 with a discovery header 322, the discovery header 322 may be configured with a lower coding rate than the discovery payload 324. The discovery header 322 may have a predetermined (i.e., a deterministic) MCS. In these embodiments, the coding rate and modulation (i.e., the MCS) of the discovery header 322 may be predetermined and may be known to the receiving UE 114 allowing the receiving UE 114 to easily and quickly decode the discovery header 322. The use of a lower coding rate for the discovery header 322 may help to ensure more robust reception of the discovery header 322. In these embodiments, a repetition code or a lower coding rate of ½ may be used for the discovery header 322 while a greater coding rate of ⅔, ¾, ⅚ or ⅞ may be used for the discovery payload 324 depending on the level of robustness desired. In these embodiments, QPSK modulation, for example, may be used for both the discovery header 322 and the discovery payload 324, although the scope of the embodiments is not limited in this respect.

In some embodiments, the coding rate of the discovery payload 304/324 (FIGS. 3A/3B) may correspond to different levels of robustness. The UE 112 may select the coding for the discovery payload 304/324 based on a desired level of robustness. In these embodiments, the discovery packet may be configured without a header or with a header. In some embodiments, prior to configuring the discovery packet 300/320, the UE 112 may perform a proximity sensing process to identify the receiving UE 114 (as well as other ProSe enabled devices in its proximity). The UE 112 may select one of the levels of robustness based on a range (or proximity) to the receiving UE 114 and/or channel conditions. In these embodiments, lower coding rates (more coding bits) and smaller payload size combinations may be used from a longer range (greater robustness may be needed), while higher coding rates and larger payload size combinations may be used for a shorter range (less robustness may be needed). In these embodiments, the range to the receiving UE 114 may be based on received signal power from the receiving UE 114, although this is not a requirement as other range estimation and proximity detection techniques may be used. These embodiments may be employed with or without transmit power control (TPC).

In some of these embodiments in which the UE 112 is arranged to configure and transmit the discovery packet 320 with a discovery header 322, the discovery header 322 may be mapped to one or more REs 211 (FIG. 2) that are allocated for D2D discovery and that are adjacent to an uplink PUSCH DMRS symbol (e.g., DMRS symbol 210 (FIG. 2)) in order to take advantage of the best possible channel estimation since the DMRS may be used by UEs for channel estimation. In these embodiments, the discovery payload 324 may be mapped to REs allocated for D2D discovery other than REs used for the discovery header and REs used for the uplink PUSCH DMRS symbol. In these embodiments, the discovery header 322 may be transmitted in REs 211 adjacent to the DMRS symbol 210 while some of the remaining REs (i.e., REs of discovery zone 204 except REs used for discovery header and DMRS symbol) may be used for transmission of the discovery payload 324.

For example, if one resource block has one PRB pair (e.g., 14 OFDM symbols in the time domain and one PRB in the frequency domain), the DM-RS symbols may be located in 4th and $11^{th}$ OFDM symbols. The discovery header 322 may be mapped to some REs in the $3^{rd}$ and 12th OFDM symbols while the remaining REs may be used for discovery payload mapping. In these embodiments, the discovery header 322 and the discovery payload are multiplexed in the same discovery resource 324.

In some embodiments, the UE 112 may transmit the discovery packet 300/320 in accordance with a single-carrier frequency division multiple access (SC-FDMA) technique on discovery resources of a discovery zone 204, although this is not a requirements. In other alternate embodiments, the UE 112 may transmit the discovery packet 300/320 in accordance with an OFDMA technique.

In some embodiments, the UE 112 may append the discovery packet 300/320 with parity check bits when turbo coding is employed for channel coding. In these embodiments, turbo coding, such as the turbo coding technique specified in 3GPP TS36.212, may be reused for D2D discovery, although the scope of the embodiments is not limited in this respect.

In some embodiments, after adding the CRC 306/326 to a discovery packet 300/320, the UE 112 may encode the discovery packet 300/320 in accordance with a tail-biting convolutional coding (TBCC) technique when TBCC is used (i.e., instead of turbo coding). In these embodiments that employ TBCC, the discovery packet 300/320 may be appended with additional parity check bits. In these embodiments, the TBCC technique specified in 3GPP TS36.212 may be reused for D2D discovery, although the scope of the embodiments is not limited in this respect.

In some embodiments, after channel coding, the UE 112 may perform rate matching based on an amount of resources to be used for the D2D transmission of the discovery packet 300/320. During rate matching, coded bits (after channel coding) may be rate-matched to fill the amount of resources (e.g., PRBs) to be used for the D2D transmission of the discovery packet 300/320. In these embodiments, the rate matching and interleaver as specified in 3GPP TS36.212 may be reused for D2D discovery, although the scope of the embodiments is not limited in this respect. In accordance with some of these embodiments, one or more PRB pairs may be used for transmission of the discovery packet 300/320 depending on the payload size and performance requirements. In these embodiments, the rate matching may include generating a number of bits based on the number of PRBs allocated for transmission from a fixed-rate mother code. This may be realized by repeating or puncturing the bits of a mother codeword.

In some embodiments, after the rate matching, the UE 112 may perform bit scrambling on the coded bits in accordance with a scrambling sequence. A scrambling identity may be used to initialize the scrambling sequence. The scrambling identity may either be a cell identity (ID), a common scrambling identity, a function of the discovery resources used for transmission of the discovery packet 300/320, a function of the cyclic shift value and/or OCC index of the DMRS that is transmitted by the UE 112 or a common D2D scrambling identity or a combination of the these parameters. In these embodiments, the use of bit scrambling may help randomize interference and improve the ability of the receiving UE 114 to receive and decode the discovery packet 300/320.

In some embodiments, the signaling received from the eNB 104 may indicate that the discovery zone 204 is either semi-statically signaled using radio-resource control (RRC) signaling or may be provided in one or more system-information blocks (SIBs). The UE 112 may be configurable by the eNB 104 for either Type 1 D2D discovery or Type 2 D2D discovery. When configured for Type 1 D2D discovery, resources for transmission of the discovery packet 300/320 are allocated by the eNB 104 on a non-UE specific basis. When configured for Type 2 D2D discovery, specific resources for transmission of the discovery packet 300/320 are allocated by the eNB 104 to the UE 112. In some embodiments, for type 1 discovery (contention based D2D discovery or D2D discovery with UE-autonomous selection of discovery resources), a ProSe enabled device may randomly select the DMRS sequence when transmitting the discovery packet (e.g., when a discovery header is used or when the discovery payload size and MCS are predetermined).

In some embodiments, the discovery-related content included in the discovery payload 304/324 (FIGS. 3A/3B) may include a unique ID for device identification, a service identifier, etc. In some embodiments, the size of the discovery payload may range from 48 bits or less to up to 100 bits or more. In some embodiments, for non-public safety service, the discovery payload 304/324 may include a ProSe application code, a ProSe function ID and a public land mobile network (PLMN) ID. For public safety service, the discovery payload 304/324 may include source/destination ID, a message type, a ProSe application ID, etc. In some embodiments, the destination ID may identify a single UE or a group of UEs that are the intended recipients of the discovery packet. In some embodiments, a UE mode of operation may be indicated which may define whether a public safety ProSe UE is acting as a UE-to-network relay, a UE-to-UE relay or both, or not acting as a relay.

Figure 4:
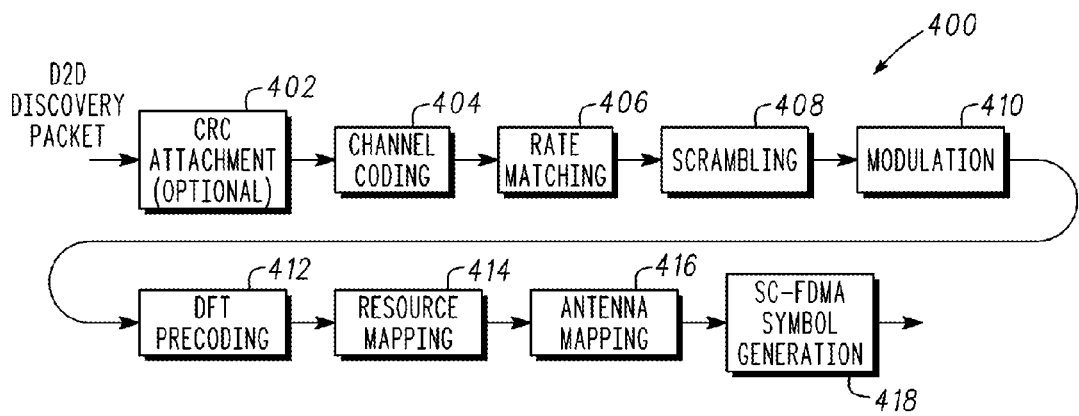
FIG. 4 illustrates D2D discovery packet processing in accordance with some embodiments.

FIG. 4 illustrates D2D discovery packet processing 400 in accordance with some embodiments. The elements illustrated in FIG. 4 may be performed by a physical layer, such as the physical layer (PHY) circuitry of a UE, such as UE 112 (FIG. 1).

The physical layer processing 400 may include attaching a CRC to the discovery packet at CRC attachment 402. The CRC attachment may be either processed in the physical layer or in the MAC layer. The CRC attachment may be optional. In addition, 8, 16 or 24 parity check bits may be used for packet-based D2D discovery design.

The physical layer processing 400 may include channel coding 404. Different from the Turbo coding scheme adopted for PUSCH, tail-biting convolutional coding (TBCC) used in PDCCH may be performed for packet-based D2D discovery and may provide improved performance and reduced decoding complexity. Furthermore, TBCC coding scheme may outperform Turbo coding for a packet with relatively small payload size, such as a discovery packet. For example, TBCC may achieve better link level discovery performance than Turbo coding when the payload size is 48 bits. When the payload size is 176 bits, Turbo coding may slightly outperform the TBCC, depending on various factors. Additionally, QPSK may provide considerable performance gain compared to 16QAM for both payload sizes.

The physical layer processing 400 may include rate matching 406. After the channel coding, coded bits may be rate-matched to fill into the amount of resources available for the D2D discovery transmission. That the amount of resource blocks for packet-based D2D discovery may be one or more PRB pairs, depending on the payload size and overall discovery performance requirement. In addition, the PRB size may be limited to the products of the integers 2, 3, and 5 as specified for PUSCH transmission of SC-OFDM waveform to reduce the implementation cost, although the scope of the embodiments is not limited in this respect.

The physical layer processing 400 may include scrambling 408. In order to help randomize the interference, bit scrambling may be applied after rate-matching. The scrambling identity for the initialization of scrambling sequence may be available at the discovering UE 112 to ensure proper and efficient decoding process. For both open and restricted discovery, a common scrambling identity may be used for all ProSe enabled devices within the network 100. This scrambling identity may be configured as a common D2D scrambling identity, although the scope of the embodiments is not limited in this respect. For example, for intra-cell discovery, this scrambling identity may be configured as the cell ID. For inter-cell or inter-PLMN discovery, the scrambling identity may be configured as a virtual scrambling identity, which may be predefined or broadcast by an eNB 104.

When the scrambling identity is configured as cell ID, the scrambling sequence generator may be initialized with:

$$c_{init}=f(N_{ID}^{cell})$$

where $N_{ID}^{cell}$ is the cell ID. One straightforward way is to define the scrambling identity as $c_{init}=N_{ID}^{cell}$.

As mentioned above, the scrambling identity may be configured as common scrambling identity, $$c_{init}=f(N_{ID}^{D2D})$$

where $N_{ID}^{D2D}$ is the virtual scrambling identity. One way is to define the scrambling identity as $c_{init}=N_{ID}^{D2D}$.

In some alternate embodiments, the scrambling identity may be configured as a function of discovery resource index (i.e., time and frequency index within the discovery zone), the cyclic shift index used for DMRS sequence transmission or cell ID, a common D2D scrambling identity or any combination of the above parameters. In some embodiments, the scrambling identity may be defined as a function of the cyclic shift index and/or OCC index used for DMRS sequence transmission and cell ID or common scrambling identity as follows:

$$c_{init}=f(n_{CS},N_{ID}^{cell})$$

where $n_{CS}$ is the DMRS sequence index, which may be a function of cyclic shift index and/or OCC index. For open discovery, a UE 102 may randomly select the cyclic shift index for DMRS sequence transmission. One approach is to define the scrambling identity as $$c_{init}=n_{CS} \cdot c_0+N_{ID}^{cell}.$$

where $c_0$ is a constant. For instance, $c_0$ may be chosen as $2^{14}$ to save the computational complexity.

In some alternate embodiments, the scrambling identity may be defined as a function of discovery resource index, cyclic shift index used for DMRS sequence transmission and cell ID or common scrambling identity:

$$c_{init}=f(n_s,n_f,n_{CS},N_{ID}^{cell}),$$

where $n_s$ is the subframe index within the discovery zone and $n_f$ is the PRB index within the discovery zone. One approach is to define the scrambling identity as:

$$c_{init}=n_s \cdot c_0+n_f \cdot c_1+n_{CS} \cdot c_2+N_{ID}^{cell}.$$

where $c_0$, $c_1$ and $c_2$ are the constants. In some embodiments, $c_0$, $c_1$ and $c_2$ may be chosen as a power of two to save the computational complexity.

The physical layer processing 400 may include modulation 410. The modulation schemes supported for PUSCH transmission may include QPSK, 16QAM and 64QAM. For the discovery payload 304/324, different modulation schemes may be used, however, QPSK modulation scheme may be desirable for the discovery header 322, although the scope of the embodiments is not limited in this respect.

The physical layer processing 400 may include discrete Fourier transform (DFT) precoding 412. Similar to a PUSCH transmission, DFT precoding may be utilized for packet-based D2D discovery in order to reduce the peak-to-average power ratio (PAPR), which can improve the transmit power efficiency and may potentially increase the discovery range for ProSe-enabled devices.

The physical layer processing 400 may include resource mapping 414. The discovery resources for packet transmission may be either randomly selected from within the configured discovery zone 204 by a ProSe enable device in contention-based discovery or explicitly allocated by an eNB 104 in non-contention-based discovery. In some embodiments, a multi-cluster PUSCH transmission may be applied for packet-based D2D discovery to exploit the benefits of frequency diversity. The frequency gap between two clusters may be configured and addressed appropriately in order to reduce the co-channel interference in the discovery region.

The physical layer processing 400 may include antenna mapping 416. When a ProSe-enabled device is equipped with multiple transmit antennas, a multi-antenna transmission scheme may be employed to further improve the link level performance. A common precoder structure may be used for open D2D discovery to allow power-efficient discovery.

The physical layer processing 400 may include SC-FDMA symbol generation 418. SC-FDMA symbol generation procedure for PUSCH transmission may be be reused for packet-based D2D discovery design, including cyclic-prefix (CP) insertion and a half-subcarrier shift.

As discussed above, the uplink PUSCH DMRS may primarily be used for channel estimation for coherent demodulation of the PUSCH. For packet-based D2D discovery, a similar DMRS sequence generation procedure based on Zadoff-Chu sequences may be adopted. A UE specific cyclic shift may be either randomly selected by ProSe-enabled devices in contention based discovery scenario or explicitly signaled by an eNB 104 in contention free discovery scenario. With respect to the DMRS base sequences, a common base sequence may be used by all ProSe-enabled devices, which may reduce the amount of blind detections at the discovery UEs significantly. Alternatively, the base sequence may be selected or chosen as a function of the cell on which an RRC_IDLE D2D device camps on or an RRC_CONNECTED D2D device is associated to (for within network coverage scenarios) and a function of the identity of the Peer Radio Head (PRH) or cluster head (for partial or outside network coverage scenarios). This may help improve the robustness of the channel estimation via interference averaging effects. Note that while sequence-group hopping may be disabled for discovery packet transmissions, cyclic shift hopping may be enabled if the base sequence not common and is a function of camping cell-ID, PRH-ID, etc. as described above. In some embodiments, ProSe-enabled UEs may randomly choose one of two OCCs for the PUSCH DMRS, although the scope of the embodiments is not limited in this respect.

In order to exploit the benefits of frequency diversity, frequency hopping may be adopted for packet-based D2D discovery. Similar to frequency hopping for PUSCH transmission, two options of hopping pattern design may be employed: type-1 D2D discovery hopping utilizes the explicit hopping pattern; while type 2 D2D discovery hopping uses the subband hopping and mirroring mechanism. In addition, the hopping procedure may follow either intra-subframe or inter-subframe based hopping mode. Selection between type-1 and type-2 discovery hopping, as well as intra-subframe and inter-subframe hopping may be provided by higher layer in a cell-specific manner.

Figure 5:
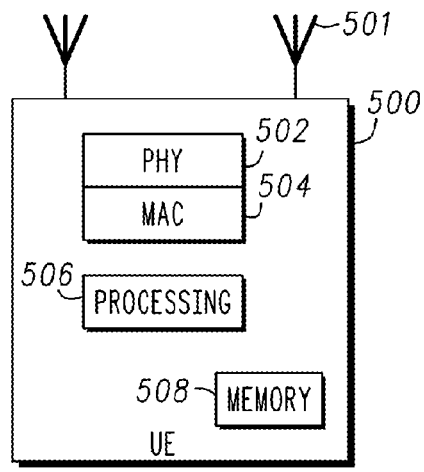
FIG. 5 illustrates a functional block diagram of a UE in accordance with some embodiments.

FIG. 5 illustrates a functional block diagram of a UE in accordance with some embodiments. The UE 500 may be suitable for use as any one or more of the UEs 102 illustrated in FIG. 1, including UE 112 and UE 114. The UE 500 may include physical layer (PHY) circuitry 502 for transmitting and receiving signals to and from eNBs 104 (FIG. 1) using one or more antennas 501 as well as for D2D communications with other UEs. UE 500 may also include medium access control layer (MAC) circuitry 504 for controlling access to the wireless medium. UE 500 may also include processing circuitry 506 and memory 508 arranged to configure the various elements of the UE 500 to perform the various operations described herein.

In accordance with some embodiments, the UE 500, while in either RRC idle or RRC connected mode, may be configured to transmit a discovery packet 101 (FIG. 1) to discover another UE as described herein and receive responses to the discovery packet 101 from the other UE. The UE 500 may also be configured to monitor and attempt to decode a received discovery packet that is transmitted in the discovery zone 204 (FIG. 2) by another UE for discovery by the other UE. The UE 500 may also be arranged to establish a D2D connection with another UE after either discovering the other UE or after being discovered by another UE. The channel resources for the D2D discovery and the D2D connection may be assigned by the eNB 104 as discussed herein.

In accordance with some embodiments, the UE 500 may be configured to receive signaling from an eNB 104 indicating resources of the discovery zone 204 allocated for D2D discovery and may configure a discovery packet 300/320 in accordance with a predetermined configuration to have at least a discovery payload 304/324 and a CRC 306/326. The discovery payload may be configured include discovery-related content. The UE 500 may also transmit the discovery packet 300/320 on at least some of the indicated discovery resources for receipt by a receiving UE.

In some embodiments, the UE 500 may a portable wireless communication device or a mobile device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas 501 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the UE 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 6:
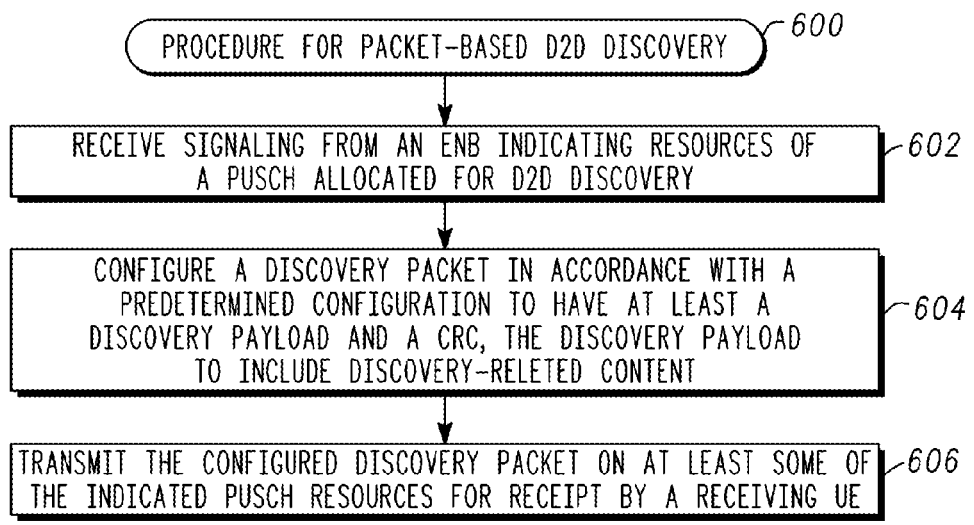
FIG. 6 is a procedure for packet-based D2D discovery in accordance with some embodiments.

FIG. 6 is a procedure for packet-based D2D discovery in accordance with some embodiments. Discovery procedure 600 may be performed by a ProSe enabled UE arranged for packet-based D2D discovery, such as UE 112 (FIG. 1).

Operation 602 may include receiving signaling from an eNB 104 indicating resources allocated for D2D discovery.

Operation 604 may include configuring a discovery packet 300/320 in accordance with a predetermined configuration to have at least a discovery payload 304/324 and a CRC. The discovery payload may include discovery-related content.

Operation 606 may include transmitting the configured discovery packet 300/320 on at least some of the indicated discovery resources (e.g., PRBs 206 of discovery zone 204) for receipt by a receiving, such as UE 114 (FIG. 1).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) arranged for packet-based device-to-device (D2D) discovery operations, the UE being enabled for proximity services, the UE configured to:

receive signaling from an enhanced node B (eNB) indicating resources allocated for D2D discovery;
configure a discovery packet in accordance with a predetermined configuration to have at least a discovery payload and a cyclic-redundancy check (CRC), the discovery payload to include discovery-related content; and
transmit the discovery packet on at least some of the indicated resources for receipt by a receiving UE.

2. The UE of claim 1 wherein the UE is arranged to configure and transmit the discovery packet in accordance with the predetermined configuration without a header,
wherein the UE is further configured to transmit a demodulation reference signal (DMRS), and
wherein the DMRS is selected to indicate a payload size and/or modulation and coding scheme (MCS) of the discovery payload.

3. The UE of claim 2 wherein the UE is arranged to configure and transmit the discovery packet without a header,
wherein the discovery payload is configurable to have one of a plurality of predetermined payload size and MCS combinations,
wherein each of the predetermined payload size and MCS combinations is mapped to one of a plurality of base sequences of the DMRS, and
wherein the UE is arranged to select a DMRS having one of the base sequences based on the payload size and MCS combination of the discovery packet.

4. The UE of claim 2 wherein the discovery payload is configurable to have one of a plurality of predetermined payload size and MCS combinations,
wherein each of the predetermined payload size and MCS combinations is mapped to one of a plurality of cyclic shifts (CS) values and/or an orthogonal cover codes (OCCs) of a DMRS, and
wherein the UE is further configured to select a DMRS that has a CS value and OCC based on the payload size and MCS combination of the discovery packet.

5. The UE of claim 1 wherein the UE is arranged to configure and transmit the discovery packet without a header, and
wherein the discovery payload is configured to have a predetermined payload size and a predetermined modulation and coding scheme (MCS).

6. The UE of claim 1 wherein the UE is arranged to configure and transmit the discovery packet in accordance with the predetermined configuration with a discovery header,
wherein the discovery header is configured to indicate one of a plurality of predetermined payload size and modulation and coding scheme (MCS) combinations of the discovery payload.

7. The UE of claim 6 wherein the discovery header is configured with a lower coding rate than the discovery payload, and
wherein the discovery header has a predetermined MCS.

8. The UE of claim 1 wherein a coding rate of the discovery payload corresponds to different levels of robustness, and
wherein the UE is arranged to select the coding rate for the discovery payload based on a desired level or robustness.

9. The UE of claim 8 prior to configuring the discovery packet, the UE is further configured to perform a proximity sensing process to identify the receiving UE, and
wherein the UE is arranged to select one of the levels of robustness based on a range to the receiving UE.

10. The UE of claim 6 wherein the discovery header is mapped to one or more resource elements (REs) that are adjacent to an uplink DMRS symbol, and
wherein the discovery payload is mapped to REs allocated for D2D discovery other than REs used for the discovery header and REs used for the uplink DMRS symbol.

11. The UE of claim 1 wherein the UE is arranged to transmit the discovery packet in accordance with a single-carrier frequency-division multiple access (SC-FDMA) technique on the indicated resources of a discovery zone,
wherein the UE is further arranged to append the discovery packet with parity check bits when turbo coding is employed for channel coding,
wherein after adding the CRC to the discovery packet, the UE is further configured to encode the discovery packet in accordance with a tail-biting convolutional coding (TBCC) technique when TBCC is used instead of turbo coding.

12. The UE of claim 11 wherein after channel coding, the UE is further configured to perform rate matching based on an amount of resources to be used for transmission of the discovery packet,
wherein during the rate matching, coded bits are rate-matched to fill the amount of resources to be used for the transmission of the discovery packet,
wherein after the rate matching, the UE is configured to perform bit scrambling on the coded bits in accordance with a scrambling sequence.

13. The UE of claim 1 wherein the UE is configured to perform bit scrambling on coded bits of the discovery packet in accordance with a scrambling sequence,
wherein a scrambling identity is used to initialize the scrambling sequence,
wherein the scrambling identity is one or more of a cell identity (ID), a common scrambling identity, a function of discovery resources used for transmission of the discovery packet, and a function of the cyclic shift value and/or orthogonal cover code (OCC) index of a demodulation reference signal (DMRS) that is transmitted by the UE.

14. The UE of claim 1 wherein the signaling received from the eNB indicates that a discovery zone is either semi-statically signaled using radio-resource control (RRC) signaling or is provided in one or more system-information blocks (SIBs),
wherein the UE is configurable by the eNB for either Type 1 D2D discovery or Type 2 D2D discovery,
wherein when configured for Type 1 D2D discovery, resources for transmission of the discovery signal are allocated by the eNB on a non-UE specific basis, and
wherein when configured for Type 2 D2D discovery, specific resources for transmission of the discovery packet are allocated by the eNB to the UE.

15. A method for packet-based device-to-device (D2D) discovery operations performed by user equipment (UE) enabled for proximity services, the method comprising:
receiving signaling from an enhanced node B (eNB) indicating resources allocated for D2D discovery;
configuring a discovery packet in accordance with a predetermined configuration to have at least a discovery payload and a cyclic-redundancy check (CRC), the discovery payload to include discovery-related content; and
transmitting the configured discovery packet on at least some of the indicated resources for receipt by a receiving UE.

16. The method of claim 15 wherein the discovery packet is configured without a header and the UE is further configured to transmit a demodulation reference signal (DMRS), and wherein the method includes selecting the DMRS to indicate a payload size and/or modulation and coding scheme (MCS) of the discovery payload.

17. The method of claim 15 wherein the discovery packet is configured with a discovery header, the method includes configuring the discovery header to indicate one of a plurality of predetermined payload size and modulation and coding scheme (MCS) combinations of the discovery payload.

18. The method of claim 15 wherein a coding rate of the discovery payload corresponds to different levels of robustness, and
wherein the method includes selecting the coding rate for the discovery payload based on a desired level or robustness.

19. A non-transitory computer-readable storage medium that stores instructions for execution by one or more processors for packet-based device-to-device (D2D) discovery operations performed by user equipment (UE) enabled for proximity services, the operations to configure the UE to:
receive signaling from an enhanced node B (eNB) indicating resources allocated for D2D discovery;
configure a discovery packet in accordance with a predetermined configuration to have at least a discovery payload and a cyclic-redundancy check (CRC), the discovery payload to include discovery-related content;
select a demodulation reference signal (DMRS) to indicate a payload size and/or modulation and coding scheme (MCS) of the discovery payload; and
transmit the configured discovery packet on at least some of the indicated resources for receipt by a receiving UE.

20. The non-transitory computer-readable storage of claim 19 wherein the UE is further configured to transmit the selected DMRS.

21. The non-transitory computer-readable storage of claim 19 wherein when the discovery packet is configured with a discovery header, the UE is further configured to refrain from selecting a DMRS to indicate the payload size and/or MCS of the discovery payload, and
configure the discovery header to indicate one of a plurality of predetermined payload size and MCS combinations of the discovery payload.

22. User Equipment (UE) enabled for proximity services and arranged for packet-based device-to-device (D2D) discovery operations in a long-term evolution (LTE) network, the UE comprising physical-layer (PHY) and medium-access control (MAC) layer circuitry configured to:
receive signaling from an enhanced node B (eNB) indicating resources allocated for D2D discovery;
configure a discovery packet in accordance with a predetermined configuration to have at least a discovery payload and a cyclic-redundancy check (CRC), the discovery payload to include discovery-related content;
select a demodulation reference signal (DMRS) for transmission to indicate a payload size and/or modulation and coding scheme (MCS) of the discovery payload when the predetermined configuration of the discovery packet does not include a discovery header,
configure the discovery header to indicate one of a plurality of predetermined payload size and MCS combinations of the discovery payload when the predetermined configuration of the discovery packet includes a discovery header; and
transmit the discovery packet on at least some of the indicated resources for receipt by a receiving UE.

23. The UE of claim 22 wherein when the predetermined configuration of the discovery packet does not include a discovery header and includes a discovery payload with a predetermined payload size and MCS combination, the UE is configured to refrain from selecting a DMRS to indicate a predetermined payload size and MCS combination.

* * * * *